United States Patent [19]

Pollard

[11] 4,352,019
[45] Sep. 28, 1982

[54] IN-VIVO RADIATION COUNTER

[75] Inventor: David E. Pollard, Livermore, Calif.

[73] Assignee: Helgeson Nuclear Services, Inc., Pleasanton, Calif.

[21] Appl. No.: 156,921

[22] Filed: Jun. 6, 1980

[51] Int. Cl.³ .............................................. G01J 1/42
[52] U.S. Cl. .................................. 250/394; 250/366; 250/367
[58] Field of Search ................... 250/336, 361 R, 366, 250/367, 362, 374, 375, 394, 395

[56] References Cited

U.S. PATENT DOCUMENTS

| | | | |
|---|---|---|---|
| 3,376,417 | 4/1968 | Keck et al. | 250/367 |
| 3,832,545 | 8/1974 | Bartko | 250/367 X |
| 3,898,457 | 8/1975 | Packard et al. | 250/367 X |
| 3,970,852 | 7/1976 | Richey et al. | 250/363 S |

Primary Examiner—Davis L. Willis
Attorney, Agent, or Firm—Bielen and Peterson

[57] ABSTRACT

A radiation counter utilizing at least one detector for sensing radiation from a living body. The radiation counter also includes an aperture for forming a corridor between the body and the detector. A shield outside the corridor prevents passage of background radiation through the corridor and gaining access to the detector. The counter also includes a device for isolating a selected portion of the body from the corridor such that radiation counting is restricted to a region of the body.

6 Claims, 4 Drawing Figures

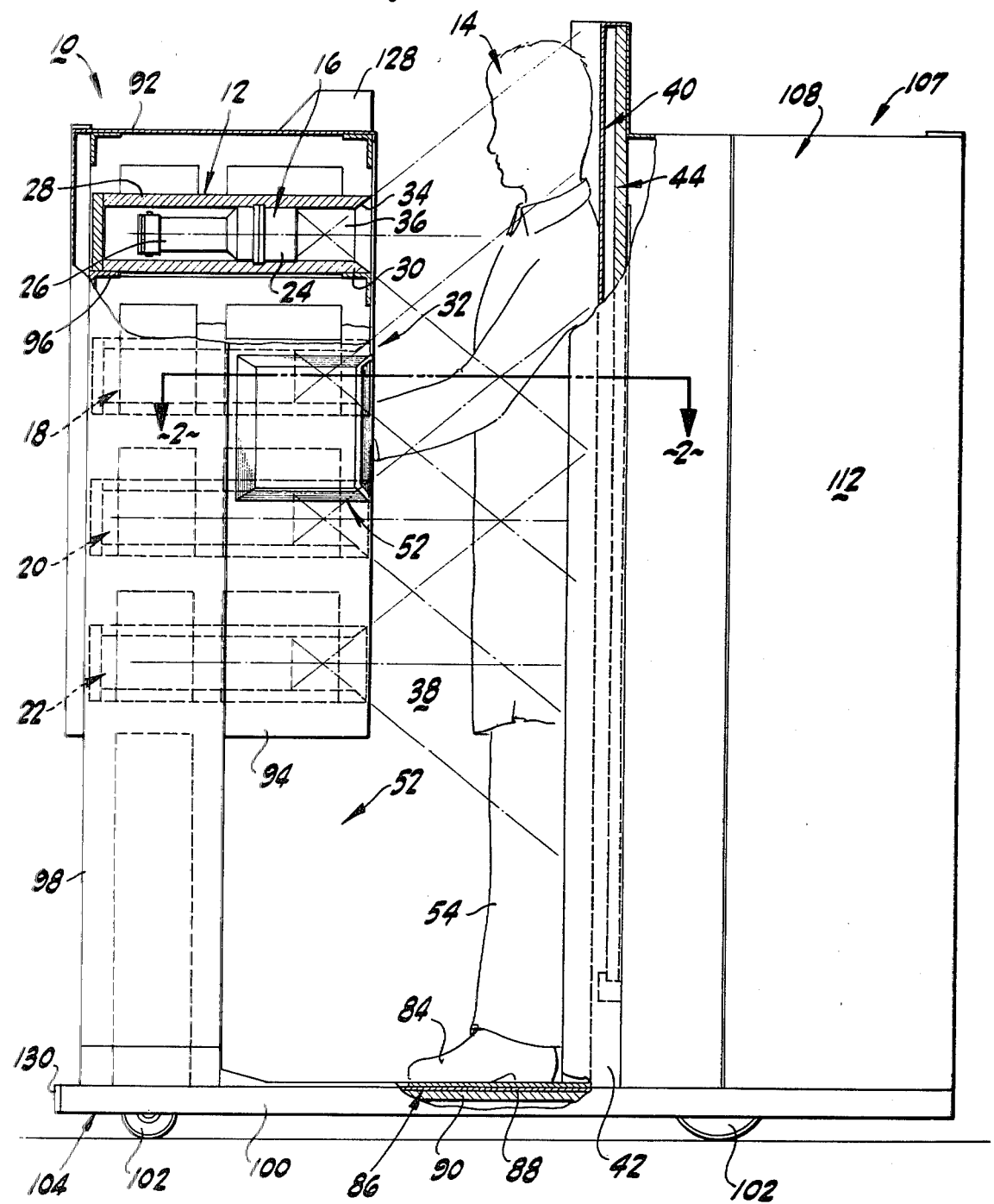

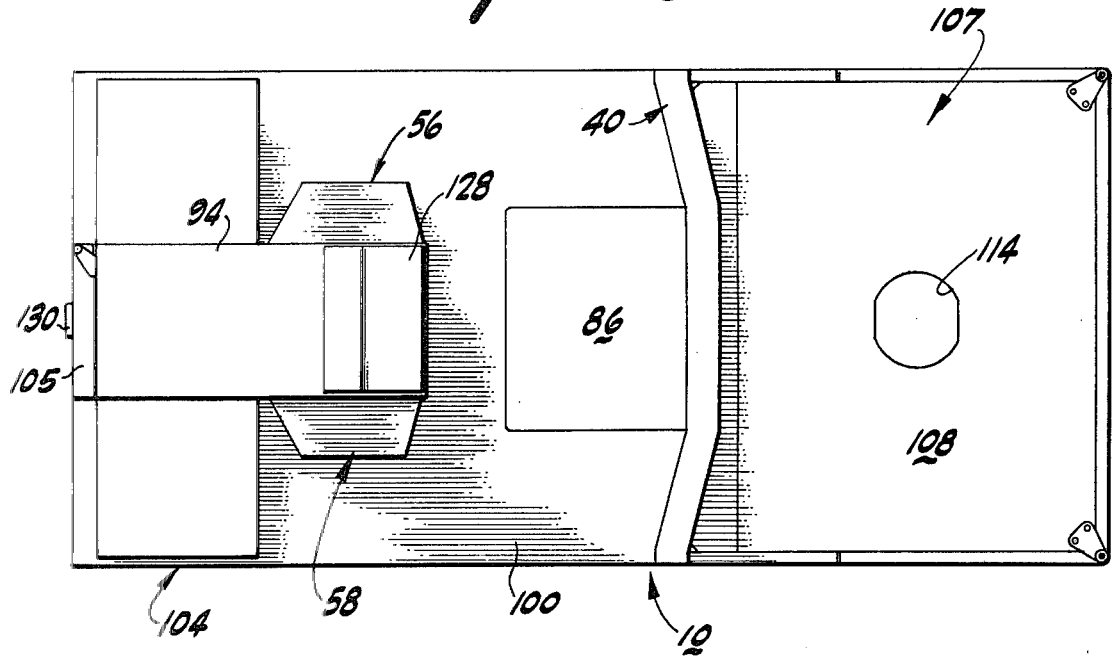
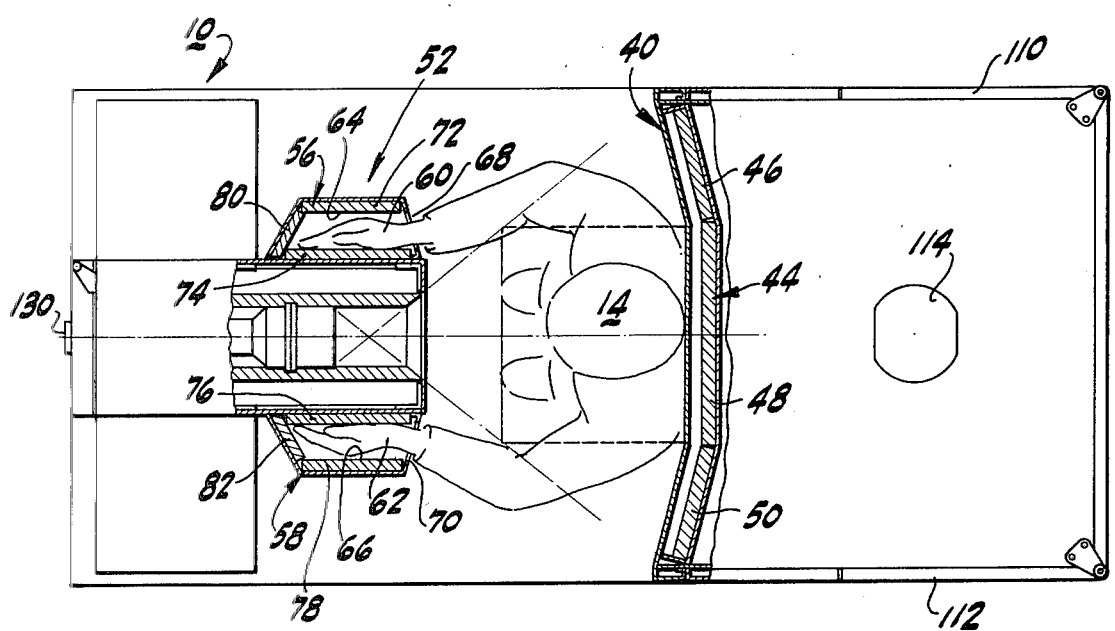

1

IN-VIVO RADIATION COUNTER

BACKGROUND OF THE INVENTION

The present invention relates to a novel radiation counter which is especially useful for, but not limited to, the detection of the radiation contamination on a body.

Any facility which handles radioactive materials normally has access to a whole-body counter which may accurately detect the presence of radionuclides and pinpoint the position of the same in a body. Unfortunately, the whole-body counters currently being marketed, such as the "Whole-Body-Counter" manufactured by Helgeson Nuclear Services, Inc. of Pleasanton, Calif., require ten minutes of time per person as well as an operator, in most cases. Evaluation of the results from the whole-body-counters must be at a location remote from the actual measuring device, in certain cases.

There is a need for a radiation counter which can quickly and easily detect radioactive contamination on and/or internally deposited radionuclides in selected parts of the body as a complimentary procedure to a whole-body-counter.

SUMMARY OF THE INVENTION

In accordance with the present invention a novel and useful in-vivo radiation counter is provided.

The radiation counter of the present invention employs means for detecting radiation from a body. Such means may include a single detector or a multiplicity of detectors spaced apart from one another. Aperture means forms a corridor for access of selected radiation to the detecting means. The aperture means is located between the detecting means and the body.

In the case where the means for detecting radiation from the body includes a plurality of detectors stacked in adjacent spaced configuration, each detector includes an aperture for forming a portion of the corridor.

The radiation counter for a body also includes means for shielding the corridor from passage of radiation to the same and to the radiation detection means. The shielding means thus greatly reduces stray or background radiation to an acceptable level. The shielding means is located such that the body being tested for radiation lies between the shielding means and the aperture means.

The radiation counter of the present invention also includes means for isolating a selected portion of the body from the corridor formed as heretofore described. Such isolating means may embrace the use of the placement of a body portion within the corridor and/or means for removing and shielding a portion of the body from the corridor. Such isolation means may include a compartment placed on a structure which houses the detecting means and aperture means. In the case where the portion of the body being isolated is the hands, the compartment may take the form of a pocket which is easily within reach of the person being tested for radiation.

The radiation counter also has as one of its elements means for determining an aspect of the radiation detected by the detecting means. For example, the determining means may produce a quantitative and/or qualitative analysis of the radiation which was found in the body. The determining means may also include a separate analysis of the part of the body which is isolated from the detecting means, i.e. the hands, legs, and the like.

It may be apparent that a novel and useful radiation counter for quickly determining radioactive contamination has been described.

It is therefore an object of the present invention to provide a radiation counter for a body which can quickly and automatically determine the quantity and quality of radiation in a particular portion of a body without the need for a whole body counting analysis.

It is another object of the present invention to reduce the need for air sampling programs within a facility employing radionuclides.

It is yet another object of the present invention to determine the source of radioactive contamination by isolating the analyses of different parts of a body which have come in contact with such radiation.

It is yet another object of the present invention to provide a radiation counter for a body which may be easily transported to on-the-site location for use thereat.

It is yet another object of the present invention to provide a radiation counter for a body which may be operated by the person being analyzed for radioactive contamination.

The invention described hereinabove has other objects and advantages especially as concerns particular characteristics and features thereof, which will become apparent as the specification continues.

BRIEF DESCRIPTION OF THE DRAWINGS

FIG. 1 is a side elevational view of the device in use with a broken away portion showing typical detector.

FIG. 2 is a view taken along line 2—2 of FIG. 1 and represented therein as a broken portion.

FIG. 3 is a top plan view of the radiation counter of the present invention.

Figure 4:
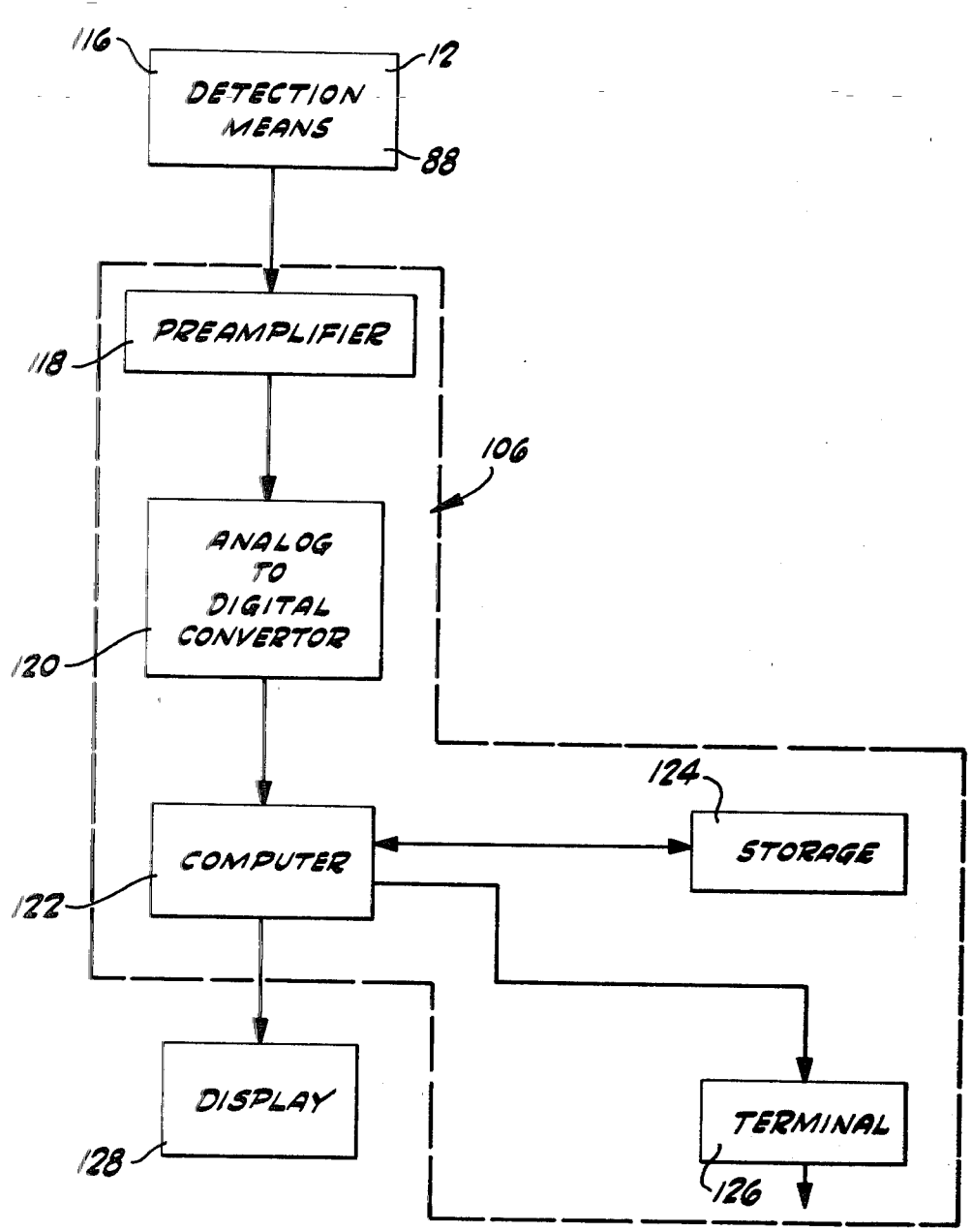
FIG. 4 is a diagrammatic view of the radiation counting mechanism of the present invention.

For a better understanding of the invention, reference is made to the following detailed description.

DESCRIPTION OF THE PREFERRED EMBODIMENT

Various aspects of the present invention will evolve from the following detailed description of the preferred embodiment thereof which should be taken in conjunction the heretofore described drawings.

With reference to FIG. 1, it may be seen that the radiation counter for a body as a whole is depicted by reference character 10 and includes as one of its elements means 12 for detecting radiation from the body 14. Detection means may include detector 16 alone or in combination with detectors 18, 20, and 22. Detector 16 includes a thallium activated sodium-iodide crystal 24 such as one manufactured by the Harshaw Chemical Company, Solon, Ohio. Such a crystal 24 is mostly activated by gamma radiation such that electrons are released by any photoelectric or radiation emanating from body 14. A photomultiplier 26 multiplies the electron release for use in ascertaining the level of radioactivity in body 14, which will be hereinafter discussed. Detector 18 is surrounded by a lead shield 28 having an end portion 30 which serves as aperture means 32. End portion 30 includes a beveled edge 34 which surrounds an opening 36 through which radiation passes before bombarding detector 18. It should be noted that detectors 20, 22, and 24 also include lead shields identical or similar to lead shield 28. Aperture means 32 may which may include the end portions of the lead shields adjacent detectors 18, 20 and 22, forms a corridor 38 which permits the access of selected radiation to detection means 12 from body 14. As shown in FIGS. 1 and 2, corridor 38 may take the form of a truncated pyramid having irregular end surfaces. It may be apparent from FIG. 1 that corridor 38 concentrates radiation detection by detection means 12 to thoractic region of body 14. Theoretically, any radiation originating in corridor 38 will impinge on detection means 12.

Background radiation is held to a low level by the use of shield 40 which is located behind body 14. In other words, body 14 is placed between shield 40 and detection means 12. Shield 40 includes a support structure 42 and lead shielding 44 which may be in stacked configuration. With reference to FIG. 2, it may be seen that lead shielding 44 is in three sections, 46, 48, and 50, angularly disposed in relation to one another. Although the shield means 40 functions to shield corridor 38 against background radiation, it has been found that cosmic radiation is not completely eliminated. This factor, however, may be compensated for in the analysis performed by radiation counter 10.

Device 10 also includes means 52 for isolating a selected portion of the body 14 from corridor 38, FIGS. 1 and 2. Means 52 may, in its simplest form, include the formation of corridor 38 such that a selected portion of body 14 such as the lower leg area 54 lies outside of corridor 38 during the standing position assumed by body 14. As depicted in FIG. 1, means 52 may also take the form of rests 56 and 58 which are located outside corridor 38. Rests 56 and 58 restrict the movement of hands 60 and 62 of body 14. Rests 56 and 58 may take the form of compartments 64 and 66 which are in the form of pockets having openings 68 and 70 and five confining walls therewithin.

Compartments 64 and 66 may also include a pair of detectors 72 and 74 and 76 and 78, such as proportional counter Type 719 manufactured by L.N.D. Inc. of Oceanside, New York, which generally sandwich hands 60 and 62. Compartments 64 and 66 are also shielded by lead shields 80 and 82. It has been found that detectors 72, 74, 76, and 78 may be proportional counters which are activated by alpha, beta, or gamma radiation depending on the voltage applied thereto.

Likewise, feet 84 of body 14 may include means 86 for discerning radiation from feet 84. Means 86 may take the form of a detector 88, such as proportional counter Type 78014, manufactured by L.D.D. Inc. of Oceanside, New York, shielded from below by lead shield 90.

In the configuration shown in FIGS. 1-3, detectors 16, 18, 20 and 22 are mounted in a vertical alignment within structure 92. Structure 92 includes a closet 94 having a series of spaced shelves such as shelf 96 for support of detectors 16, 18, 20, and 22. Closet 94 is supported by pedestal 98 to platform 100. Shield means 40 also rests on platform 100 and is fastened thereto. Platform 100 includes a set of wheels 102 such that a mobile carriage 104 is formed for transporting at least the detection means 12, aperture means 32, and shield means 40, as a unit. With reference to FIG. 3 it may be seen that closet 94 includes a door 105 which is hingedly attached thereto for access to detection means 12 therewithin.

The radiation counter of the present invention may also include means 106 for determining an aspect of radiation emanating from body 14. Means 106 may be housed within closet 108 which is carried by mobile platform 100. As shown in FIG. 1, closet 108 is located outside corridor 38 directly behind shield means 40. FIG. 2 further depicts closet 108 as having a pair of doors 110 and 112 which permit access to means 106 therewithin. Ventilation opening permits the escape of heat from the inside of closet 108 normally generated by means 106. Means 106 includes the software technology normally used by existing whole body counters such as the whole-body-counter manufactured by Helgeson Nuclear Services, Inc. of Pleasanton, California. FIG. 4 depicts the schematic representation of means 106 in which the signal originating from detection means 12, means 116 for detecting radiation from hands 60 and 62 (including hand detectors 72, 74, 76, and 78), and foot detector 88 passes to a preamplifier 118. Preamplifier may be the whole body counter type preamplifier manufactured by Helgeson Nuclear Services, Inc. of Pleasanton, California. From preamplifier 118 the signal passes to analog to digital converter 120 such as the model TN-1241 manufactured by Tracor Northern, Incorporated of Middleton, Wis. The digital signal then travels to computer 122 such as the LSI 11/2 Series computer manufactured by Digital Equipment Corp. of Maynard, Mass. Computer 122 may include chassis HV-1123 manufactured by Net Com Corp. of Sunnyvale, Calif. The chassis would provide the power supply to computer 122 in the normal course of operations. Information may be passed to storage 124, such as the 10 megabyte disc storage 600 Series, manufactured by Western Dynex. Optionally, a terminal 126 could provide hard copy of any radiation data originating from detection means 12, 88, or 116. Computer 122 also serves to feed visual information to display 128 also shown on FIGS. 1 and 3 as being mounted atop closet 94 at about the eye level of body 14. Device 10 may be easily moved by two persons with the aid of a tow bar (not shown), which hooks into fitting 130.

In operation, device 10 may be used by placing body 14 in an upright position on top of foot detector 88. The user's hands 60 and 62 are placed in compartments 64 and 66. The identification of body 14 may be implemented by an infrared card reader or a key pad. Instantaneously, and continuously device 10 takes background radiation readings. The count is started after a background reading such that a count is made via detection means 12, detector 88 and detection means 116. Such detection means may perform a qualitative or quantitative analysis on the specific areas of body 14. Qualitative as well as quantitative results from the body count may be shown on display 128 and sent to storage 124 for eventual printing out of the same through terminal 126. Means 116 may also perform the function on peak searching to locate the exact centers of any contamination on body 14. As may be seen from FIG. 1, there is overlap in the scope of radiation entering detectors 16, 18, 20, and 22. Such overlap may be compensated for by means 116 such that detection means 12 performs as a unit. The exact location of radiation in body 14 would also serve as an indication of the type of radiation encountered by body 14. Device 10 may perform its count very quickly. Any serious problems indicated by device 10 would then warrant a whole body count which takes considerably more time.

While in the foregoing specification embodiments of the invention have been set forth in considerable detail for the purposes of making a complete disclosure of the invention, it may be apparent to those of ordinary skill in the art that numerous changes may be made in such details without departing from the spirit and principles of the invention.

What is claimed is:

1. A radiation counter for a body utilizing means for determining an aspect of radiation emanating from the body comprising:
   a. means for detecting radiation from specific areas of the body, including a multiplicity of radiation detectors proximately spaced from one another;
   b. aperture means for forming a corridor for permitting access of selected radiation to said means for detecting radiation from the body, said aperture means including an aperture associated with each of said multiplicity of radiation detectors, each aperture permitting the access of radiation from a specific area of the body;
   c. means for shielding the corridor from passage of radiation therethrough and to said means for detecting radiation from the body, said shielding means being located such that the body lies between said aperture means and said shielding means; and
   d. means for isolating a portion of the body including a rest for restricting movement of a selected portion of the body, said rest being located outside said corridor.

2. The radiation counter for a body of claim 1 which additionally comprises a structure for supporting said multiplicity of radiation detectors and apertures; and means for discerning radiation from the selected portion of the body isolated from said corridor by said isolating means.

3. The radiation counter for a body of claim 2 in which said means for discerning radiation from the selected portion of the body includes a shielded compartment, said shielded compartment being supported by said structure and including said rest for a selected portion of the body.

4. The radiation counter for a body of claim 3 in which said structure also supports said means for determining an aspect of the radiation detected by said detecting means, and said determining means also determines an aspect of the radiation being discerned by said discerning means from the selected portion of the body isolated from the corridor.

5. The radiation counter for a body of claim 1 which additionally comprises a mobile carriage for transporting at least said detection means, aperture means, and shielding means, as a unit.

6. The radiation counter of claim 1 in which said corridor formed by said aperture means is sized to permit the body to stand in an upright position.

* * * * *